UNITED STATES PATENT OFFICE.

FREDERICK C. ATKINSON, OF INDIANAPOLIS, INDIANA, ASSIGNOR TO AMERICAN HOMINY COMPANY, OF INDIANAPOLIS, INDIANA, A CORPORATION OF NEW JERSEY.

FOOD PRODUCT AND PROCESS OF PREPARING.

1,391,161.  Specification of Letters Patent.  Patented Sept. 20, 1921.

No Drawing.  Application filed May 27, 1919.  Serial No. 300,128.

*To all whom it may concern:*

Be it known that I, FREDERICK C. ATKINSON, a citizen of the United States, residing at Indianapolis, in the county of Marion and State of Indiana, have invented certain new and useful Improvements in Food Products and Processes of Preparing, of which the following is a specification.

My invention consists in a method of preparing food products from cereals which may be readily converted into edible condition with comparatively slight additional cooking.

As a result of extensive experiments in this particular line of endeavor, and especially with corn products, such as hominy, I have discovered that the cereal itself is of a cellular structure held together by protein and cellulose materials and that while cooking weakens and to some extent breaks down this cellular structure and softens the cementing substances, that subsequent drying results in the resetting of said cementing substances, reinforced by a small percentage of starch paste which is drawn out of the starch cells, resulting in a product that is a hard, horny mass, being harder, less soluble and more coherent than the original. For these reasons, it has been difficult to produce a cereal food product capable of quick preparation without first finely grinding the cereal.

By my experiments I have discovered that by subjecting the cereal while in a hot and moist condition to the crushing operation of rolls the cellular structure becomes distorted, the starch cells ruptured, and the adhesive quality of the natural cementing substances to a considerable extent destroyed, thus increasing the solubility, or improving the soluble property of the product as a whole.

With these discoveries as a basis, I have, therefore, worked out a method by which food products can be prepared for the table in a comparatively short space of time.

This method consists in first cleaning and preparing the cereal for cooking, then cooking by steaming in any appropriate steamer, or cooker, such as are used for such general purposes, the cooking being preferably in the presence of a certain amount of moisture, say around 17 to 22% on the basis of the dried substance of the cereal. This moisture may be derived either from condensed water, from steam, or from added water. I have found that the temperature for the cooking should be from around 85° centigrade to around 100° centigrade, but it is not necessary to raise the temperature above 100° centigrade for this purpose. The material, as it comes from the cooker, and while still moist and hot, is passed between rolls capable of exerting great pressure. The rolls themselves should be maintained at a temperature not less than 85° centigrade and not necessarily higher than 110° centigrade, preferably spaced about .08 of an inch apart, at which distance apart the rolls cannot crush many of the individual starch cells but rather distorts the cellular structure of the corn and breaks the cementing material that holds the starch cells together, dislodging said starch cells from their original position. This product is dried and then ground, the distorted or flake hominy or material being converted into grits, or a granular condition, resulting in a product that is to a fair degree soluble in diastase and chemically convertible into maltose sugar, and on boiling in water from three to five minutes practically the entire starch content is soluble in diastase.

By varying the pressure of the crushing rolls by which the hot and moist cereal is crushed, the degree to which the starch cells are dislodged and distorted may be varied and also the proportion of dislodged soluble starch in the final product. By this method it is possible to extend the scope and usefulness of the flaking or rolling operation so that as a final result pre-cooked products of coarser granules can readily be produced.

Having thus fully described my said invention, what I claim as new and desire to secure by Letters Patent, is:

1. The method of preparing food products from cereals, which consists in cooking the cereal in the presence of moisture until it is in a soft and moist condition, then crushing said cereals while in such moist and hot condition between heated rolls, then drying the resulting product, and then granulating by grinding, substantially as set forth.

2. The method of producing pre-cooked food products from cereals which consists in cooking the cereal in the presence of moisture and in a temperature between 85° to 100° centigrade, then crushing the moist and hot cooked product between rolls heated to a temperature of between 85° and 110° centigrade, then drying the product, and then grinding it, substantially as set forth.

In witness whereof, I have hereunto set my hand and seal at Indianapolis, Indiana, this 17th day of May, A. D. nineteen hundred and nineteen.

FREDERICK C. ATKINSON. [L. S.]

Witnesses:
E. W. BRADFORD,
M. L. SHULER.